United States Patent [19]
Beal et al.

[11] Patent Number: 5,746,645
[45] Date of Patent: May 5, 1998

[54] WORKING A NATURAL OR SYNTHETIC HARD STONE SUCH AS A GEMSTONE

[75] Inventors: David William Beal, Wooburn Green; Peter Armstrong Aked, Reading; David Antony Homer, Maidenhead; Timothy James Osgood, Basingstoke, all of United Kingdom; Eric Jozef Gentil Blondeel, Bruges, Belgium; Ewan Howden Croucher, Whitburn, United Kingdom

[73] Assignee: Gersan Establishment, Liechtenstein

[21] Appl. No.: 851,118

[22] Filed: May 5, 1997

Related U.S. Application Data

[63] Continuation of Ser. No. 352,885, Dec. 9, 1994, abandoned.

[30] Foreign Application Priority Data

Dec. 13, 1993 [GB] United Kingdom ............... 9325443

[51] Int. Cl.$^6$ .................................................. B24B 49/00
[52] U.S. Cl. ............................... 451/11; 451/41; 451/389
[58] Field of Search ............................... 451/1, 11, 389, 451/390, 41, 12

[56] References Cited

U.S. PATENT DOCUMENTS

| | | | |
|---|---|---|---|
| 2,534,384 | 12/1950 | Spira | 451/389 |
| 3,109,268 | 11/1963 | Printz | 451/389 |
| 3,110,136 | 11/1963 | Spira | 451/389 |
| 3,704,555 | 12/1972 | Millett . | |
| 4,085,547 | 4/1978 | Lawson et al. . | |
| 4,348,838 | 9/1982 | Tacchella . | |
| 4,603,512 | 8/1986 | Cave et al. . | |
| 4,653,361 | 3/1987 | Zobeli . | |
| 4,669,300 | 6/1987 | Hall et al. . | |

FOREIGN PATENT DOCUMENTS

| | | |
|---|---|---|
| 121332 | 3/1944 | Australia . |
| 842093 | 9/1976 | Belgium . |
| 876794 | 6/1979 | Belgium . |
| 0271644 | 9/1987 | European Pat. Off. . |
| 842093 | 9/1976 | Germany . |
| 876794 | 6/1979 | Germany . |
| 881509 | 3/1988 | South Africa . |
| 1726276 | 7/1989 | U.S.S.R. . |
| 572988 | 11/1945 | United Kingdom . |
| 1515276 | 6/1978 | United Kingdom . |
| 1589523 | 5/1981 | United Kingdom . |
| 1600863 | 10/1981 | United Kingdom . |
| 2088759 | 6/1982 | United Kingdom . |
| 2100153 | 12/1982 | United Kingdom . |

OTHER PUBLICATIONS

Patent Abstract of Japan, vol. 017 No. 395, (M-1451) 23 Juillet 93 & JP-A-05 077127 (Takahiro Imahashi) 30 Mars 93.

Patent Abstract of Japan vol. 016 No. 391 (M-1298) 12 Aout 92 & JP-A-04 129657 (Takahiro Imahashi) 30 Avril 1992.

*Primary Examiner*—Robert A. Rose
*Attorney, Agent, or Firm*—Cesari and McKenna

[57] ABSTRACT

For blocking or polishing a natural or synthetic stone having a Mohs hardness greater than about 5, a blocking head has a body, a mounting member which can move vertically with respect to the body, and a rotary spindle driven by a motor. The mounting member is carried by a leaf spring whose position is altered by a parallel linkage whose arm is driven by a motor. In this way, the spring can for soft landing apply an upwards bias opposing the gravitational force of the mass of the mounting member. When the stone is in contact with the scaife, the deflection of the spring measures the force on the stone, and this deflection is detected by an LVDT. Subsequently, the spring can apply a downwards bias to augment the working force. A microprocessor is responsive to the output of the LVDT and controls the motor so that the force applied to the stone complies with a predetermined program.

21 Claims, 6 Drawing Sheets

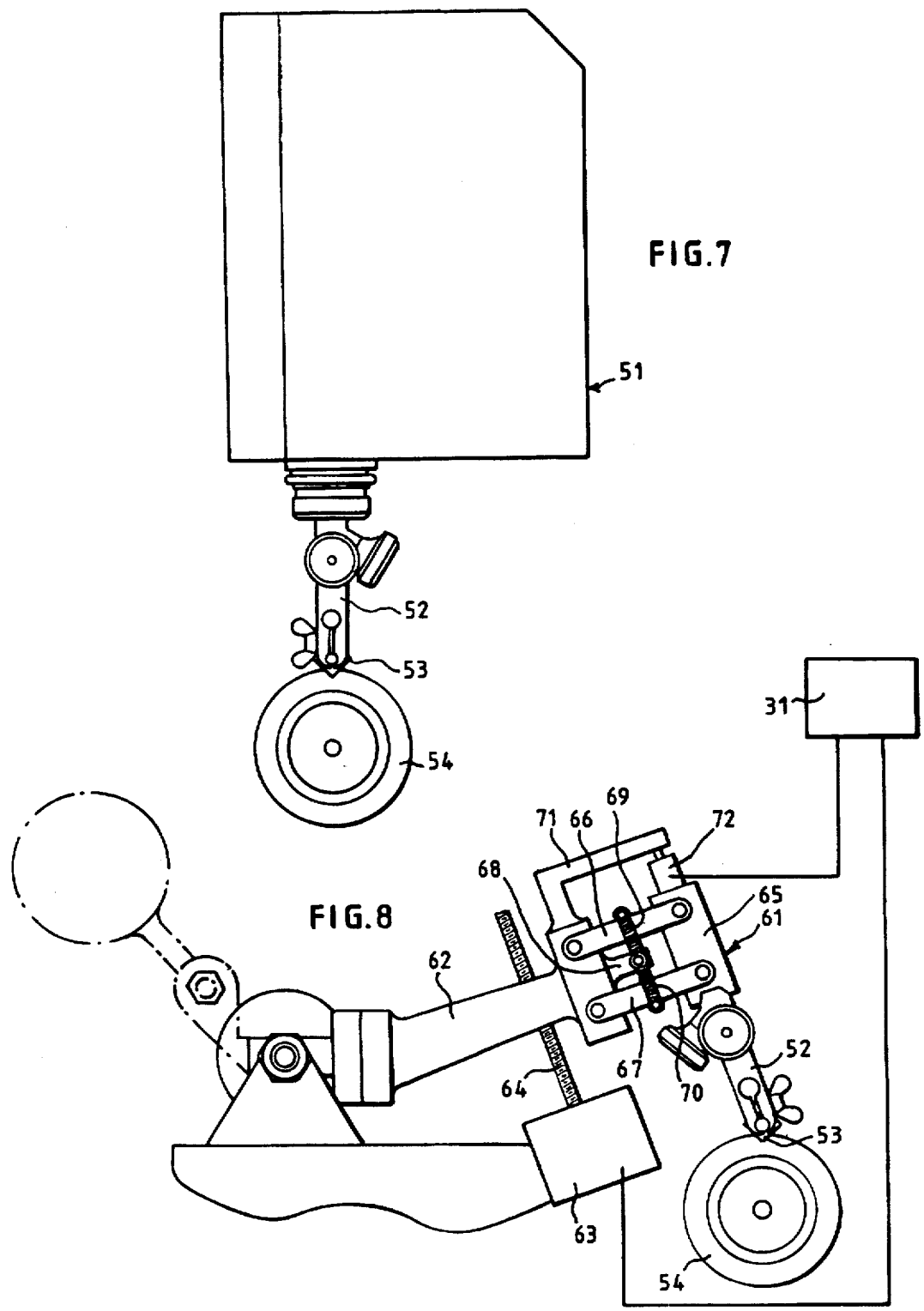

WORKING A NATURAL OR SYNTHETIC HARD STONE SUCH AS A GEMSTONE

CROSS REFERENCE TO RELATED APPLICATION

This application is a continuation of Ser. No. 08/352,885, filed on Dec. 9, 1994, now abandoned.

BACKGROUND OF THE INVENTION

The present invention relates to apparatus for working a stone having a hardness greater than about 5 or 6 on the Mohs scale, using a tool. The apparatus has a support member and a mounting member for mounting a stone holder or a tool holder, the mounting member being movable relative to the support member to provide feed and apply a working force between the stone and the tool. The support member will constrain the movement of the mounting member.

The working can be any suitable working operation, though the invention is particularly suitable for working a facet on the stone in a blocking or polishing operation or for shaping makeables (removing excess material from an irregularly-shaped stone), when the relative movement between the mounting member and the support member would usually be at right angles to the facet or face being worked. However, the invention is also applicable to other operations such as sawing or kerfing.

The stone being worked can be any natural or synthetic hard stone, such as gem diamond, industrial diamond, synthetic diamond or other natural or synthetic gemstones. Diamond has a Mohs hardness of about 10, sapphire and ruby about 9, cubic zirconium about 8 or 9 and emerald about 7.5 to 8.

When working hard stones, a consistent "soft landing" is desirable; a soft landing is contact with a low initial contact force. For instance, when polishing a diamond facet using a rotating scaife, a soft landing will permit the engagement of a sharp diamond edge without damaging the scaife. However, whether or not soft landing is available, it is desirable to have an inexpensive and reliable system for controlling the working force.

BE 876 794 discloses a sawing machine in which the gravitational force applied by the weight of the tang is reduced by an opposing rotating threaded spindle which applies an adjustable upwards force through a rubber block. In effect, the rubber block is not very elastic, and if there is any slight eccentricity in the sawing blade when initiating kerfing, the tang leaves the rubber block and the full weight of the tang is applied to the stone. This increases the risk of breakage of a point off the stone, should kerfing be initiated at a point.

GB 1 600 863 discloses a sawing machine in which the gravitational force applied by the weight of a torque arm is increased by a helical compression spring fitted between the torque arm and a rigid mount which is moved in order to provide feed. If there is slight eccentricity in the sawing blade when initiating kerfing, the force applied to the stone will correspond to the weight of the torque arm plus the biassing of the spring, and will be considerable.

U.S. Pat. No. 4,669,300 discloses an instrument for determining the surface profile or contour of an object. A stylus is moved over the surface of the object, and the force must remain constant as the stylus moves vertically. However, the force applied by the stylus is a gravity force which is opposed by an adjusting force applied electromagnetically and is kept constant. There is no feed-back, though a linear variable differential transformer is incorporated in order to give a profile reading.

BE 889 464 discloses a sawing machine in which the gravitational force applied by the weight of the tang is reduced by a counterweight which is carried on a threaded spindle. The counterweight has its position altered by winding it along the threaded spindle, and thereby alters the upward biassing on the stone.

GE 1 589 523 discloses a polishing machine with a mounting member which is vertically slidable on and swingable about the axis of a vertical torsion bar positioned outside the scaife. The working force is controlled by a C-shaped spring assembly whose free end biasses the mounting member upwards and whose other end can be rotated to alter the biassing.

The Invention

Using the apparatus of the invention, a spring or biassing means can be actuated in order to cause an approach between the stone and tool and provide the soft landing. Because the biassing means diminishes the force applied by the force applying means, a small bump on a scaife or a slight eccentricity in a circular sawing blade would not for example cause the full weight of the mounting member (and any associated item such as a tang and holder) to be applied to the stone. This significantly reduces the risk of breakage of a point or damage to the tool if a point of the stone first engages a scaife (promoting extended scaife life and permitting the touchdown with a sharp diamond edge without damaging the scaife) or a sawing blade, and also enables the approach of the stone to the tool to be speeded up, reducing the overall time taken for the working operation. A suitable soft landing force can be predetermined, for instance 40 gms weight for polishing a facet. The system can be particularly sensitive, and a 25 gm weight soft landing force can be provided under ideal conditions. The possible sensitivity (resolution) can be significantly better than using a rubber block as in BE 876 794.

During working, the biassing force can be altered so that it increases the working force. For instance, with a blocking or polishing head whose components moving vertically with the stone weigh 500 gms, the biassing force can be alterable from an upwards force of greater than 500 gms wt to a downwards force of 700 gms wt, to provide a working force of 1200 gms wt.

Further advantages are that the apparatus can be used for grain finding by controlling the polishing force, and can be used for measuring the rate and amount of cut, the amount of cut giving an accurate measurement of depth to which the facet has been polished, without the need for pot contact.

The Biassing Means

The biassing means can in general be in a direction for decreasing the working force or in a direction for increasing the working force, or may in some embodiments be changeable at will in order to provide either decrease or increase in the working force. The biassing force can be alterable to provide a controlled working force.

The biassing means can comprise a spring or any non-rigid arrangement. By "non-rigid" it is meant either that the biassing means do not contact the mounting member or that some type of elastic contact is used. If an elastic contact is used, significant movement, say 25 microns at 50 Hz or 5 microns at 170 Hz, must be permitted without a gross decrease in the force applied by the biassing means when acting in a direction tending to decrease the working force, though some decrease in the applied force will occur with a 25 micron movement at 50 Hz or a 5 micron movement at 170 Hz. 50 Hz corresponds roughly to one standard scaife speed, namely 2800 r.p.m.; 170 Hz corresponds roughly to one standard sawing blade speed, namely 10000 r.p.m. A convenient form of biassing means is a spring system such as a leaf spring or rod spring or a well-designed tension or compression spring, but in general terms any effectively elastic means can be used, i.e. means in which relative movement in one sense increases the biassing force; thus arrangements such as an air bag or magnetic or electromagnetic attraction or repulsion can be used. If a spring system is being used, the actuating means can be for increasing or reducing the tension of the spring system and/or can be for reversing the direction of the force applied by the spring. A spring system can conveniently be arranged to increase or decrease the working force, at will, having a null point and being operable both sides of the null point, the null point being the configuration of the spring system when it applies no biassing force. A single leaf or rod spring is very suitable to act as such a system though two or more parallel springs could be used; two coaxial pre-loaded tension or compression springs could be used with the ends connected to the mounting member and the ends connected to the actuating means, or vice versa.

An advantage of the use of effectively elastic means is that the soft landing force can be set independently of the mass of the mounting member and items fixed to it such as the stone or tool holder, in that the increased deflection of the biassing means on contact between the stone and tool indicates the total contact force. The apparatus can be arranged so that the spring system or other elastic means always operates within a linear response field or another response field which is known and consistent.

The effectively elastic means may be a spring system which is bent about an axis, e.g. an axis normal to the spring system longitudinal axis if the spring system is elongate. The bending axis may be substantially at right angles to the axis of relative rotational and/or translational movement between the mounting member and the support member. To alter the biassing force, one portion of the spring system can be moved linearly or it can be given a rotary movement, for instance about an axis spaced from the spring system. The spring system preferably comprises an elongate spring (preferably generally or substantially straight when relaxed) extending generally at right angles to the axis of relative rotational and/or translational movement between the mounting member and the support member.

It is not essential to have a type of elastic means because a type of electromagnetic biassing can be used, for instance as disclosed in U.S. Pat. No. 4,669,300.

Where the mounting member is vertically movable relative to the support member, as is normally the case for a head for working a facet, such as a blocking or polishing head for forming the facet or polishing the facet, the biassing force can be an upwards force on the mounting member.

If the mounting member is rotatable relative to the support member, the biassing means can be arranged to apply the biassing force on the axis of relative movement.

The Responsive Means or Sensor

Responsive means can be incorporated, responsive to the biassing force, and can be associated with control means responsive to the responsive means, for controlling the working force to comply with a predetermined programme.

Once there is contact between the stone and tool, further actuation of the biassing means alters the biassing force, which can be signalled by the responsive means.

As the stone is worked and the holder is fed, the control means can be arranged to continually actuate the biassing means so that the working force complies with a predetermined programme, in effect the feed being determined by actuating the biassing means. For instance, after an initial period at a very low contact force to form a very small facet or cut, the contact force can be stepwise or progressively-increased to a higher, constant value or to provide a higher, constant pressure as the facet area or cut length increases. The contact force can be varied to suit the type and size of stone being worked.

The control means can enable the rate of polishing of a gemstone to be measured or detected (for instance by sensing the activation of a motor adjusting the biassing means). The control means can if desired compensate for increase in facet or cut length by maintaining a constant speed of feed. If a part of the stone is hard or difficult, the pressure can be increased in order to maintain the feed.

In general, the responsive means are preferably of the non-contact type, for instance comprising a sensor such as a linearly variable differential transformer. The responsive means can be responsive to relative displacement or movement of different portions of elastic means forming the biassing means. If the biassing means operates electromagnetically using an electrical winding and a moving armature, an air gap between the winding and the armature can be measured by detecting the winding inductance and the armature position thus detected. In an alternative arrangement which can provide soft landing, the responsive means could comprise a fixed contact which is contacted when the biassing force reaches a predetermined, low value. In unsophisticated arrangements with no soft landing, there may merely be a simple means such as a limit switch to detect maximum load.

Movement of the Mounting Member

Normal practice is to have the tool in a substantially fixed location (e.g. rotating about a fixed axis though a scaife can be provided with a low frequency oscillation to provide zooting), and to move the stone in order to provide feed, in which case the stone holder is mounted by the mounting member; this arrangement can be reversed, moving the tool in order to provide feed, in which case the tool holder is mounted by the mounting member. Preferably, the mounting member is movable substantially rectilinearly relative to the support member, and the biassing force would be in a direction substantially parallel to the movement of the mounting member. In the preferred arrangement, the movement of the mounting member is vertical, though it could in some arrangements be horizontal.

Particularly for working facets, the mounting member can be rotatable (i.e. at least rotatably indexable) relative to the support member; the axis of relative rotation is preferably substantially parallel to the movement of the support member but it need not be so; the rotary axis will be normal to the scaife unless coning is being carried out in a special operation. In a preferred embodiment, for working facets, the stone is set in a specific direction prior to initiating soft landing. However, the mounting member can be rotatable relative to the support member to enable the operator to switch on an oscillating mode for optimising the polishing direction (termed "finding the grain" or "finding the optimum grain") once he has recognized the desired grain, or to switch on a rotational mode generally as described in GB 2 212 423 A if he cannot recognize the desired grain for the stone or if an optimum polishing direction cannot be detected as working proceeds; in the rotational mode, the stone is continuously rotated about an axis normal to the scaife.

The mounting member can comprise an elongate member mounted for sliding movement with respect to the support member, which elongate member can be a rotary spindle rotatable with respect to the support member, drive means being provided for rotating the spindle. If the apparatus is for working a facet on the stone, the relative movement between the mounting member and the support member is preferably at right angles to the facet.

Force Applying Means

If the mounting member moves horizontally relative to the support member, the biassing force can apply all the working force. However, there are preferably means for applying a substantially constant force in addition to said biassing force, and if vertical movement of the mounting member is permitted, the force applying means can comprise a gravity force, the biassing force being an upwards force on the mounting member.

Actuating Means or Actuating Member

Any suitable actuating means can be used. In one embodiment, the actuating means comprises an actuating member which is movable about a first axis, a follower lever which is movable about a second axis spaced from said first axis in a direction at right angles to the longitudinal axis of the follower lever, and a link connecting the actuating member and the follower lever at positions remote from the first and second axes so that the actuating member and the follower lever form a parallel linkage, and said responsive means comprises a first element fixed relative to the mounting member and a second element fixed relative to said link; the biassing means comprises effectively elastic means having a first portion connected to the mounting member for applying said biassing force and a second portion which is movable relative to said first portion to alter said biassing force and which is movable relative to the support member by the actuating means, thereby tending to move the first portion relative to the support member. The second portion may be fixed relative to said link, or may be fixed relative to said follower lever or to said actuating member. Where the effectively elastic means is a spring bending about an axis, the actuating means can move said second portion relative to said first portion in order to provide such bending; the movement may be a rotary movement about an axis which is spaced from the axis of the spring.

Polishing Head

If the apparatus of the invention is being used to work a facet on the stone, the mounting member can mount a tang for holding the stone, and a motor such as a pneumatic motor can be incorporated for indexing the tang about an axis normal to the facet being worked, for achieving the correct grain.

BRIEF DESCRIPTION OF THE DRAWINGS

The invention will be further described, by way of example, with reference to the accompanying drawings, in which:

FIG. 7 is an outside view of a first sawing head of an automatic sawing machine in accordance with the invention, a saw blade arrangement also being shown; and FIG. 8 is an outside view of a second sawing head of an automatic sawing machine in accordance with the invention, a saw blade arrangement also being shown.

DESCRIPTION OF THE PREFERRED EMBODIMENTS

FIGS. 1 to 6

Figure 1:
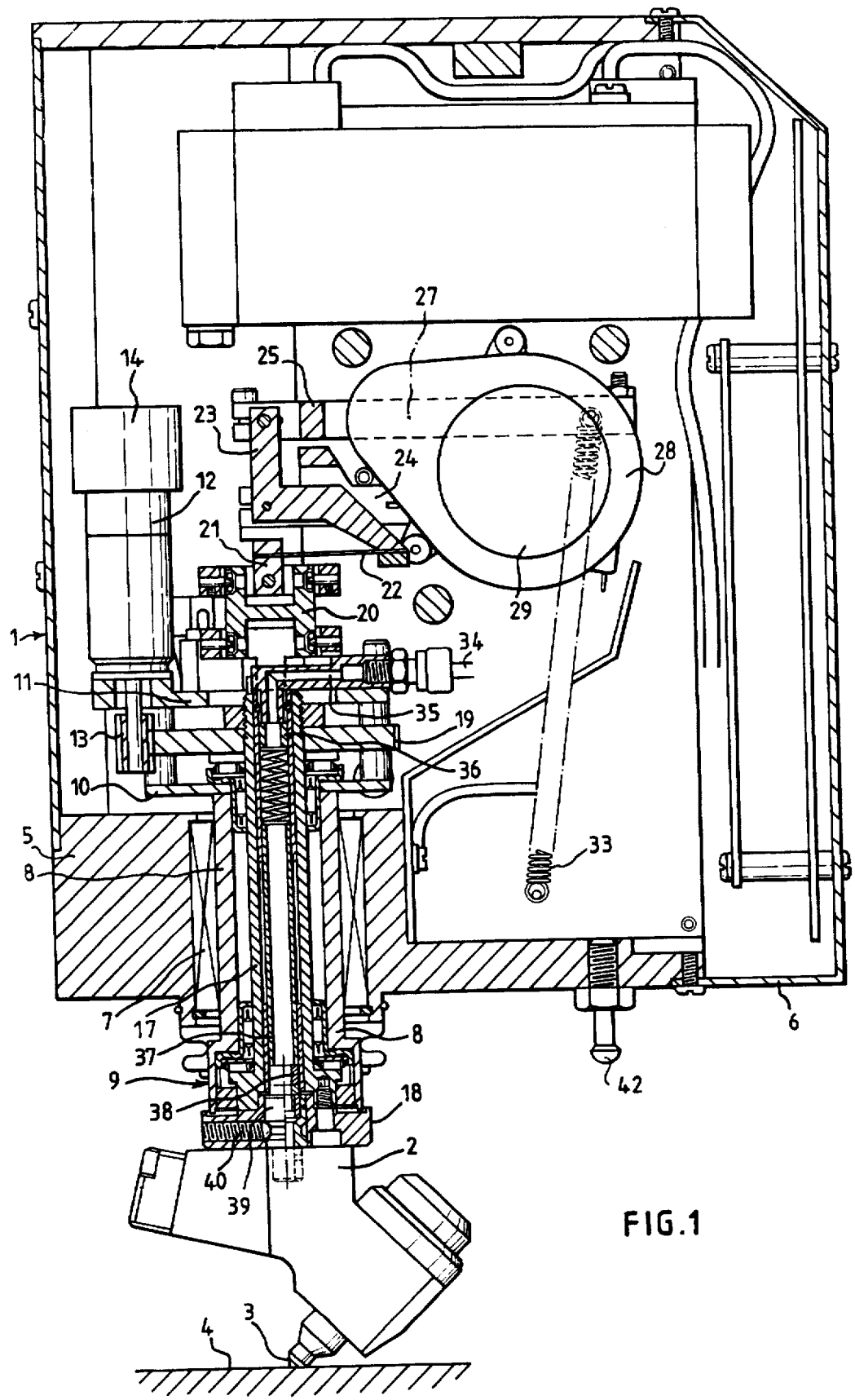
FIG. 1 is a view, mainly in vertical section along the line I—I in FIG. 3, of a polishing head of an automatic blocking machine in accordance with the invention, a tang and scaife also being shown.

FIG. 1 shows a polishing head 1 carrying a tang 2 in turn carrying a gem diamond 3 which is being polished on a rotating scaife 4. The tang 2 and scaife 4 are well known components, and will not be described further.

The head 1 has a fixed body or support member 5 having a housing 6. The body 5 mounts a linear bearing 7 which acts as a vertical guide or constraint for a tube 8 of a mounting member 9 which can thus move rectilinearly vertically relative to the body 5. At its upper end, the tube 8 carries a lower platform 10 in turn carrying an upper platform 11. To the upper platform 11 is fixed a DC motor 12 having a drive pinion 13 and a rotary encoder 14, as well as the coil of responsive means or a sensor in the form of a linearly variable differential transformer (LVDT) 15; the platform 11 also has two lugs 16 referred to below. By means of radial and axial bearings, with suitable seals, the tube 8 mounts a rotary spindle 17 whose lower end carries a quick-release fixing 18 for the tang 2 and whose upper end carries a toothed wheel 19 meshing with the pinion 13.

The lugs 16 are connected by a universal joint formed by two pivot axes at right angles, displaced vertically from each other (see FIG. 5), to an H-section link 20; the link 20 is connected by another universal joint (the crossed axes in the same plane) to a piece 21 fixed to a first end portion of biassing means in the form of a leaf or plate spring 22; the other or second end portion of the leaf spring 22 is fixed to a shaped link 23 which links a parallel follower lever 24, rotatable about a horizontal axis 25, and a yoke-like actuating member or drive arm 26, to form a parallel linkage. However any suitable parallel linkage can be provided, for instance one articulated by ball-and-socket joints rather than pivot joints. When relaxed, the spring 22 is planar and at 90° to the axis of rotary movement of the spindle 17. The spring 22 can have any suitable shape in plan view to achieve the desired spring constant; one possible shape is shown dashed in FIGS. 3 and 5, being rectangular with chamfered corners. The link 20 and associated parts are stiff about the vertical axis and prevent rotary movement of the tube 8. The drive arm 26 is rotatable about a horizontal axis 27 and is fixed to the output of a reduction gearbox 28 connected to a stepper motor 29 mounted in the housing 6. The link 23 is very roughly of inverted T-shape (see FIG. 2), and one limb carries the armature of the LVDT 15. The LVDT 15 acts as a sensor and detects movement between the end portions of the spring 22.

There is a schematic representation of control means in the form of a microprocessor 31 connected to the motor 12, LVDT 15 and motor 29. During polishing, the LVDT 15 senses the movement between the end portions of the spring 22 and hence the biassing force applied by the spring 22, and provides feedback to the microprocessor 31, enabling the microprocessor 31 to detect the instantaneous working force. If the instantaneous working force differs from the required working force, the microprocessor 31 causes the motor 29 to rotate the drive arm 26. If the working force is too little, the drive arm 26 is rotated anti-clockwise as shown in FIG. 1, and vice versa, bending or unbending the spring 22 as appropriate, about an axis normal to the paper in FIGS. 1, 2 and 6.

The whole mounting member 9 can be raised or lowered in a strictly vertical direction by operation of the motor 29 acting through-the spring 22. The spindle 17 can be rotated or indexed by means of the motor 12. The stone 3 can be indexed about its axis.

The arrangement is such that the first end portion of the leaf spring 22 is on the axis of rotation of the sprindle 17 and on the axis of linear movement of the mounting member 9. The mounting member 9 is freely movable vertically with respect to the body 5, and in the non-contact position, will hang in equilibrium on the leaf spring 22. When contact is made between the stone 3 and the scaife 4, the leaf spring 22 deflects upwards and this deflection is recorded by the LVDT 15, being proportional to the force applied between the stone 3 and the scaife 4. The working force can be increased to a value greater than that applied by the weight of the mounting member 9, by applying a downwards biassing force through the spring 22.

It can be seen that a tang 2 of a different mass can be used without upsetting the basic functioning of the arrangement, provided that the deflection of the leaf spring 22 is still within its linear response field and provided that the armature of the LVDT 15 remains within the linear range.

The head 1 is arranged so that back-lash or play is minimised. The pivot bearings of the link 20 and of the parallel linkage are conical with positive axial loading. The drive arm 26 is clamped to the gearbox output, but on one side only; on the other side, the drive arm 26 is pivoted to the housing 30 by a conical bearing 32. A positive torque applied by a helical tension spring 33 applies to an extension limb of the drive arm 26 a clockwise (as in FIG. 1) torque greater than the maximum anti-clockwise torque applicable by the spindle 17, to avoid back-lash in the gearbox 28. There is an anti-back-lash nut which removes any vertical play of the spindle 17.

Though other types of tang 2 can be used, the polishing head 1 shown is for a pneumatically indexed tang 2. A pneumatic lead 34 is shown connected to a duct 35 in the mounting member 9, leading, with suitable rotary seals and a graphite insert 36, via a spring-biassed tube 37 and a further graphite insert 38 to a spigot 39 on the tang 2. The tang 2 is held by a hemispherical-ended screw 40.

Figure 2:
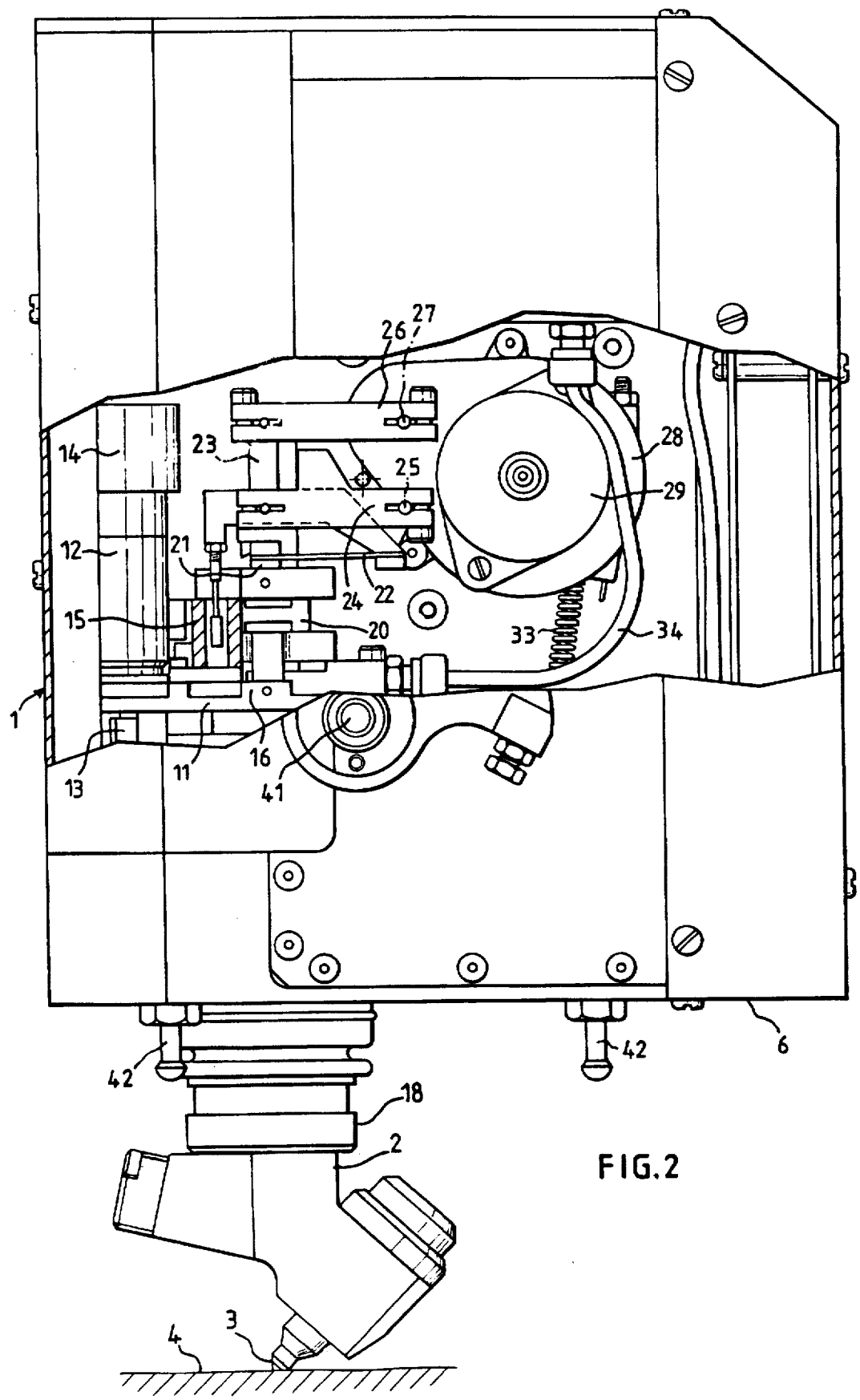
FIG. 2 corresponds to FIG. 1, but shows the polishing head in outside view, partly broken away.
Figure 3:
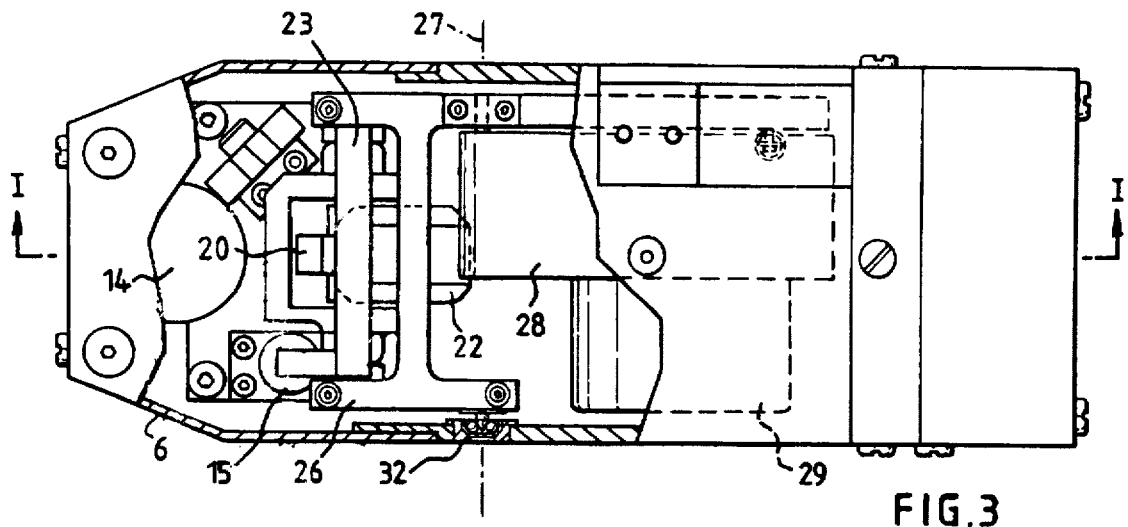
FIG. 3 is a plan view of the polishing head, partly broken away.
Figure 4:
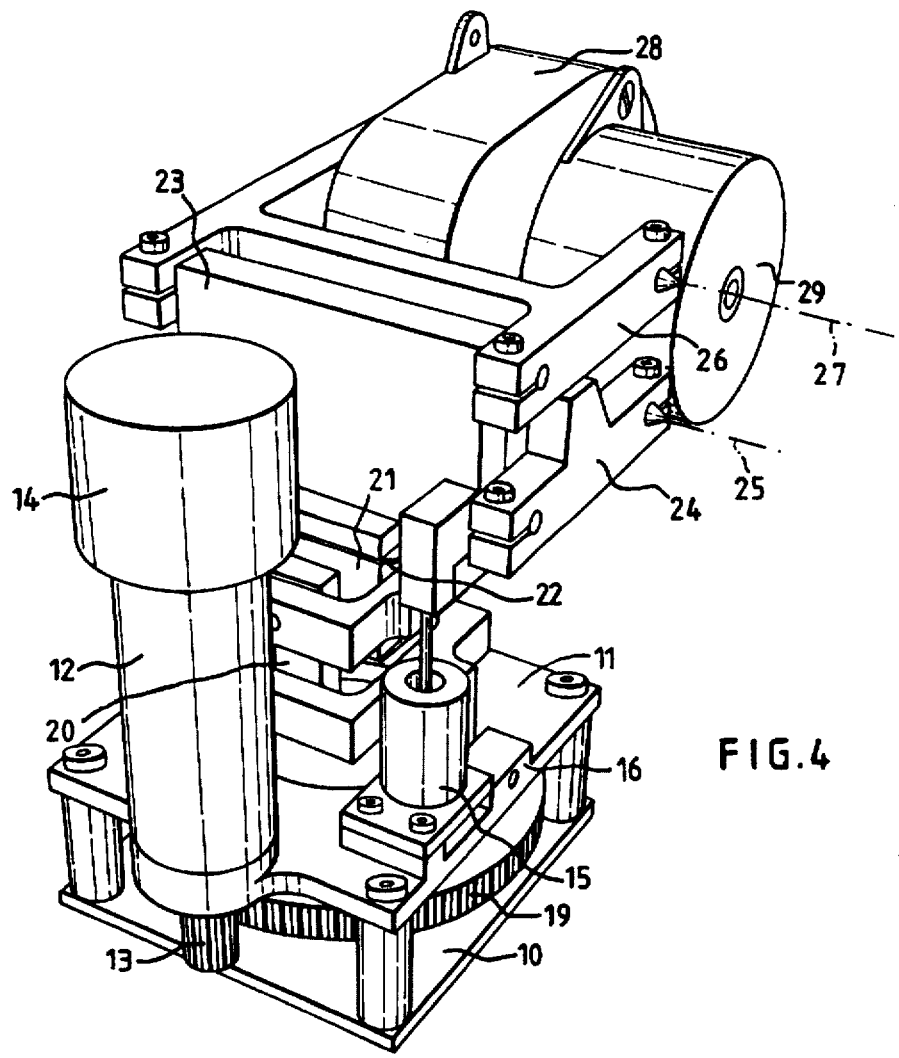
FIG. 4 is a perspective view of the upper part of the polishing head of FIGS. 1 to 3.
Figure 5:
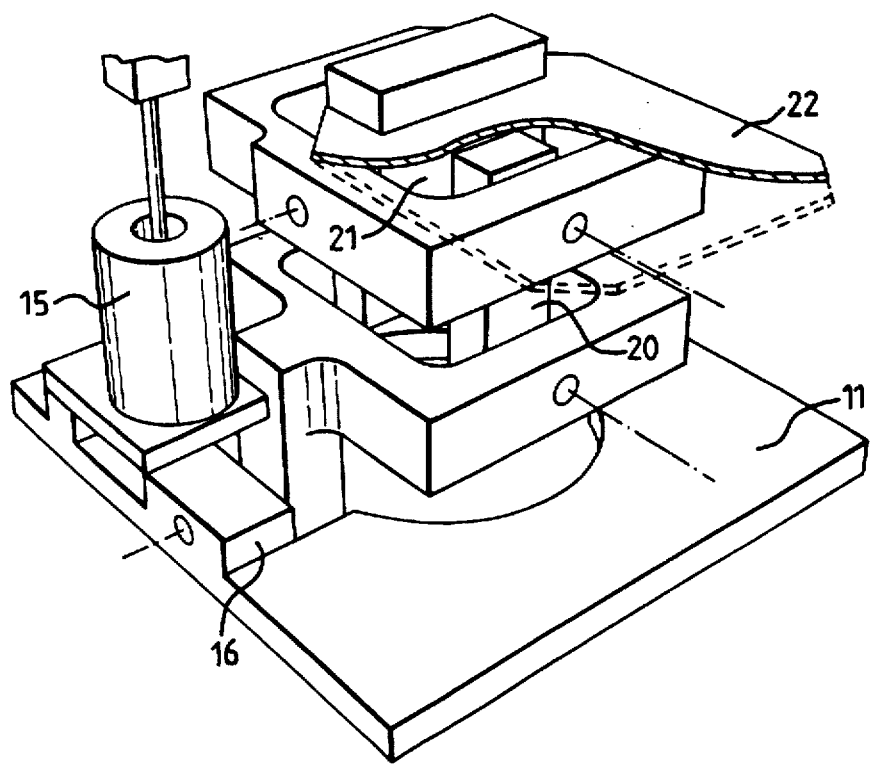
FIG. 5 is a perspective view at 90° to that of FIG. 4, but showing fewer components.
Figure 6:
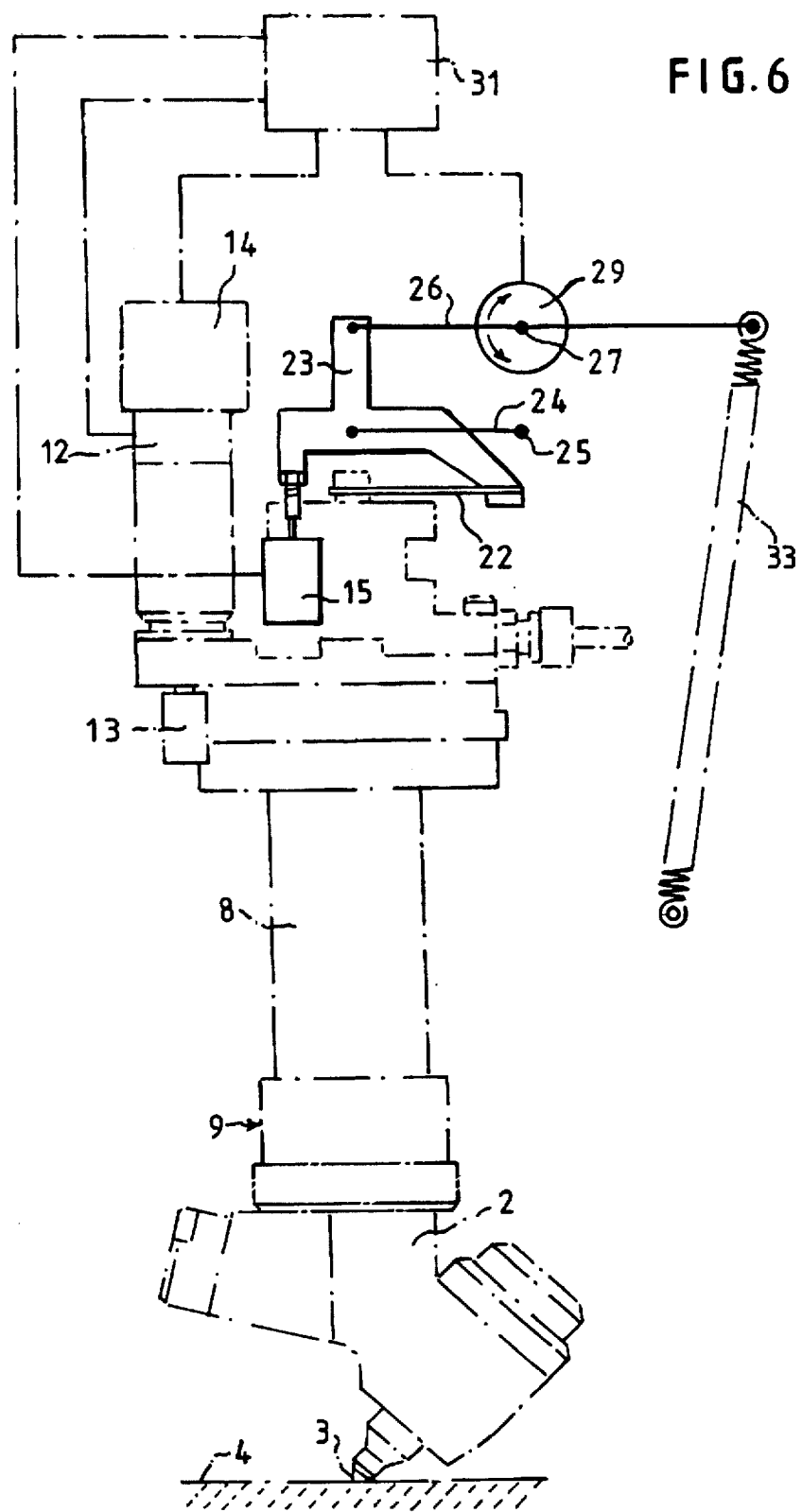
FIG. 6 is a schematic outside view, corresponding to FIG. 1, showing some components in heavy outline.

FIG. 2 shows a fixing spindle 41 which is locked in the end of a holding arm (not shown). The arm itself can be swung eg. pneumetically up and outwards about an axis to the left of and parallel to the axis of the spindle 41 in FIG. 2, ie anti-clockwise in FIG. 2. The fixing spindle 41 can be driven by a gear train and motor (not shown) mounted on the housing 6 to rotate the head 1 anti-clockwise in FIG. 2 about the axis of the spindle 41. In this way, the head can be swung upwards and outwards for inspection of, or changing, the diamond 3. The body 5 carries three levelling feet 42 for resting on a plate (not shown); the feet 42 can be individually adjusted such that the axis of the spindle 17 is normal to the scaife 4.

A number of independent heads 1 can be associated with a single scaife 4, for instance eight heads 1, to provide a polishing machine. A suitable arrangement of a polishing machine is shown in the operation manual of the Coburn Machine Co. PS1B Adjustable Planetary Skive Bench.

Example of Blocking Head

Reduction gear 28—1250:1 ratio.

Linear movement of spindle 17—3 microns per step of motor 29.

Stiffness of leaf spring 22—1.6 gms per micron.

Resolution of LVDT 15—about 1 micron.

Tang 2—16 increment click tang with own pneumatic drive motor.

Speed of rotation of spindle 17—3 to 5 rpm.

Total vertical travel of mounting member 9—8 mm in 3 micron steps.

Example of Operation for Blocking Four Facets i) If stone 3 recognised as 4 point, 3 point or 2 point, select appropriate mode. If stone 3 cannot be recognised as such, select rotational mode.

ii) Fast feed the body 5 down to an initial position with the stone 3 slightly above the scaife 4.

iii) Initiate softlanding by feeding the mounting member 9 down at 760 microns per minute.

iv) Feed continues after landing until there is an initial contact force of 40 gms wt. Discontinue feed.

v) Record a start position.

vi) Maintain the initial contact force of 40 gms for typically 3 to 5 seconds, to establish a microfacet.

vii) Ramp force up to typically 150 gms wt over 3 to 5 seconds.

viii) Keep force at 150 gms wt for between 10 and 20 seconds.

ix) Ramp force up to 750 to 1000 gms wt over 3 to 5 seconds.

x) If the predetermined grain mode is used, the tang 2 is set automatically in the first position given in the Table below, which sets out positions for the types of stone being worked (12 o'clock is with the stone culet directed towards the centre of the scaife 4), and the spindle 17 is oscillated to scan plus-or-minus 18° of the set position, in order to optimise the polishing direction. Optimisation is sensed by the rate of stepping of the motor 29 in order to maintain the contact force. When the polishing direction has been successfully optimised, the spindle 17 stops oscillating and the polishing direction is held.

Alternatively, if no optimum polishing direction is found, the spindle 17 is set automatically in the second position given in the Table; the optimisation procedure is repeated, and so on for all the grain positions given in the Table if no optimum polishing direction is found. If no optimum polishing direction can be found for any of the grain positions, or if while polishing the cut rate drops to near zero, the next facet is tried and it and the remaining facets are blocked. Therefore, if there is a facet where no optimum polishing direction can be found, the programme is such that facets on either side of the facet will be processed as this reduces the size of the facet to be polished.

If the rotation mode has been set, the spindle 17 is rotated once while the blocking head is oscillated across the face of the scaife 4, typically for 3 seconds. When the optimum polishing direction has been found, procedure is as for a predetermined grain mode. If an optimum polishing direction is not found (which may occur with for instance a naated stone where there are zones of different grain orientation), the tang 2 is continuously rotated at between 3 to 5 rpm and the rate of cutting constantly monitored. If the rate of cut increases, an optimum polishing direction is once again sought and the blocking head will lock into the optimum polishing direction.

xi) For each facet, polishing continues until press pot contact with the scaife 4 is sensed or a predetermined time out value such as 5 minutes is reached. The motor 29 then lifts the tang 2, the tang 2 is indexed to the next facet and the spindle 17 may also be indexed so that the polishing position is in accordance with the Table below; the procedure is repeated, including optimisation.

xii) When the last main facet is complete, any required grain marking facets are applied.

xiii) After one hour, the stone 3 is lifted off and "failure to complete" is signalled.

TABLE

| Type of stone | Polishing positions o'clock | | | |
|---|---|---|---|---|
| | 1st | 2nd | 3rd | 4th |
| 4 pt | 12 | 6 | 3 | 9 |
| 3 pt | 10 | 2 | 6 | — |
| 2 pt | 7 | 1 | — | — |

FIG. 7

The sawing head 51 carries a standard sawing dop 52 which is shown holding a rough diamond 53 against a standard sawing blade arrangement 54. In general terms, the sawing head 51 is the same as the polishing head 1 described in relation to FIGS. 1 to 6, but the rotary/linear bearing arrangement in the polishing head 1, which permits vertical movement and rotary movement, is replaced with a crossed-axis roller linear bearing which permits vertical movement but prevents rotation. A crossed-axis roller linear bearing is well known in the engineering field. The operation and control of the sawing head 51 is very similar to that of the polishing head 1.

FIG. 8

The sawing head 61 is mounted on a pivoted tang 62 which in general terms is similar to a standard tang but has no counterweight. The sawing head 61 carries a standard sawing dop 52 which is shown holding a rough diamond 53 against a standard sawing blade arrangement 54.

The vertical position of the tang 62 is determined by a motor 63 which can rotate a lead screw 64 in either direction, the lead screw 64 engaging a suitable nut arrangement mounted on the tang 62. The end of the tang 62 carries a mounting member 65 by means of a parallel-arm linkage with two parallel arms 66, 67. In order to provide positive or negative spring biassing, the arm 66, 67 are shown each connected to a lug 68 on the end of the tang 62 by means of respective helical tension springs 69, 70. In an alternative arrangement, a leaf spring can be fixed to the end of the tang 62, projecting along the axis of the tang 62, and engaging the mounting member 65. The end of the tang 62 also carries a bracket 71 which in turn carries the armature of an LVDT 72 mounted on the mounting member 65.

In operation, if the instantaneous radial force between the diamond 53 and the saw blade differs from the required working force, the microprocessor 31 causes the motor 63 to move the tang 62 up or down. If the working force is too little, the tang 62 is moved down and hence its end moves down in relation to the mounting member 65, causing the spring 69, 70 to apply an increased working force, which is detected by the LVDT 72; and vice versa.

The present invention has been described above purely by way of example, and modifications can be made within the spirit of the invention.

We claim:

1. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool, and the mounting member being rotatable relative to the support member about an axis of relative rotation which intersects the tool;

a spring for applying to the mounting member an alterable biasing force which can at will be either in a direction for decreasing said working force or in a direction for increasing said working force, the spring having a portion acting on the mounting member, said spring portion being intersected by said axis; and an actuating member for actuating said spring, whereby said biasing force can be altered and whereby said biasing force can be directed by said activating member to be in a direction for decreasing said working force or in a direction for increasing said working force.

2. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool;

a spring for applying to the mounting member an alterable biasing force which can, at will, be either in a direction for decreasing said working force or in a direction for increasing said working force, said spring comprising a first portion acting on the mounting member for applying said biasing force and a second portion which is movable relative to said first portion and to said support member, to alter said biasing force;

a sensor responsive to the relative positions of said first and second portions of the spring and thereby responsive to said biasing force;

an actuating member for moving said second portion of the spring relative to said support member, whereby said biasing force can be altered and whereby biasing force can be directed by said actuating member to be in a direction for decreasing said working force or in a direction for increasing said working force; and a microprocessor responsive to said sensor for causing said actuating member to move said second portion relative to said support member and thereby alter said biasing force and control said working force.

3. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool;

a spring for applying to the mounting member an alterable biasing force for altering said working force;

an actuating member for actuating the spring to alter said biasing force, which actuating member is movable about a first axis;

a follower lever which is movable about a second axis spaced from said first axis in a direction at right angles to the longitudinal axis of the follower lever;

a link connecting the actuating member and the follower lever at positions remote from the first and second axes so that the actuating member and the follower lever form a parallel linkage; and a sensor responsive to said biasing force, said sensor comprising a first element fixed relative to the mounting member and a second element fixed relative to said link.

4. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool;

a spring for applying to the mounting member a biassing force for altering said working force, the spring extending in a direction generally at right angles to the direction of relative movement between the mounting member and the support member and having a first portion acting on the mounting means and a second portion which is movable relative to said first portion and to said support member to alter said biassing force; and an actuating member for altering said biassing force by moving said second portion relative to said support member to bend or unbend said spring about an axis generally at right angles to said relative movement and to said direction.

5. The apparatus of claim 4, wherein the movement of the mounting member relative to the support member is substantially rectilinear.

6. Apparatus for working a facet on a natural or synthetic stone having a Mohs hardness greater than about 5, using a tool, comprising:

a support member;

a mounting member for mounting a stone holder, the mounting member being movable substantially rectilinearly relative to the support member to provide feed and apply a working force between the stone and the tool, and the mounting member being rotatable relative to the support member about an axis of relative rotation which intersects the tool;

a spring for applying to the mounting member an alterable biasing force which can, at will, be either in a direction for decreasing said working force or in a direction for increasing said working force, the spring having a portion engaging on said axis a part which is rigid with the mounting member regarding in the direction of said axis, and an actuating member for actuating the spring, whereby said biasing force can be altered and whereby said biasing force can be directed by said actuating member to be directed in a direction for decreasing said working force or in a direction for increasing said working force.

7. A method of working a natural or synthetic stone having a Mohs hardness greater than 5, comprising using the apparatus of claim 1, and:

mounting a stone holder on said mounting member;

mounting a said stone on said stone holder;

moving said mounting member relative to said support member to provide feed and engage said stone with a tool;

continuing to move said mounting member relative to said support member to provide feed and work a facet of said stone; and causing said actuating member to alter said biassing force and thereby control said working force.

8. A method of working a natural or synthetic stone having a Mohs hardness greater than 5, comprising using the apparatus of claim 2 and:

mounting a stone holder on said mounting member;

mounting a said stone on said stone holder;

moving said mounting member relative to said support member to provide feed and engage said stone with a tool;

continuing to move said mounting member relative to said support member to provide feed and work a facet of said stone;

said microprocessor controlling said actuating member to cause said actuating member to alter said biassing force and thereby control said working force.

9. A method of working a natural or synthetic stone having a Mohs hardness greater than 5, comprising using the apparatus of claim 3 and:

mounting a stone holder on said mounting member;

mounting a said stone on said holder;

moving said mounting member relative to said support member to provide feed and engage said stone with a tool;

continuing to move said mounting member relative to said support member to provide feed and work a facet of said stone; and said actuating member actuating the spring and hence controlling said biassing force and thereby said working force in accordance with said biassing force as sensed by said sensor.

10. A method of working a natural or synthetic stone having a Mohs hardness greater than 5, comprising using the apparatus of claim 4 and:

mounting a stone holder on said mounting member;

mounting a said stone on said stone holder;

moving said mounting member relative to said support member to provide feed and engage said stone with a tool;

continuing to move said mounting member relative to said support member to provide feed and work a facet of said stone; and causing said actuating member to alter said biassing force and thereby control said working force.

11. A method of working a natural or synthetic stone having a Mohs hardness greater than 5, comprising using the apparatus of claim 6 and:

mounting a stone holder on said mounting member;

mounting a said stone on said holder;

moving said mounting member relative to said support member to provide feed and engage said stone with a tool;

continuing to move said mounting member relative to said support member to provide feed and work a facet of said stone; and causing said actuating member to alter said biassing force and thereby control said working force.

12. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool, the mounting member being rotatable relative to the support member about an axis of relative rotation intersecting the tool;

a spring for applying to the mounting member an alterable biasing force which can, at will, be either in a direction for decreasing said working force or in a direction for increasing said working force, said spring comprising a first portion engaging on said axis a part which is rigid with the mounting member regarding movement in the direction of said axis, for applying said biasing force, and a second portion which is movable relative to said first portion and to said support member, to alter said biasing force;

an actuating member for moving said second portion of the spring relative to said support member, to alter said biasing force, said actuating member being movable about a second axis;

a follower lever having a longitudinal axis, which follower lever is movable about a third axis spaced from and parallel to said second axis;

a link connecting the actuating member and the follower lever at positions remote from the second and third axes whereby the actuating member and the follower lever form a parallel linkage;

a sensor responsive to said biasing force, said sensor comprising a first element fixed relative to the mounting member and a second element fixed relative to said link; and a microprocessor responsive to said sensor for causing said actuating member to move said second portion relative to said support member and thereby alter said biasing force and control said working force.

13. Apparatus for working a natural or synthetic stone having a Mohs hardness greater than about 5, using a tool, comprising;

a support member;

a mounting member for mounting a stone holder or a tool holder, the mounting member being freely movable relative to the support member under the force of gravity to provide feed and apply a working force between the stone and the tool;

a spring for applying to the mounting member an alterable biasing force which can at will be either in a direction for decreasing said gravity force or in a direction for increasing said gravity force, to provide a resultant working force of which one component is the force of gravity and another component is the biasing force, which spring in use before the stone contacts the tool suspends the mounting member; and a member for actuating the spring whereby said biasing force can be altered and whereby said biasing force can be directed by said actuating member to be in a direction for decreasing said working force or in a direction for increasing said working force.

14. The apparatus of claim 1, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

15. The apparatus of claim 2, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

16. The apparatus of claim 3, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

17. The apparatus of claim 4, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

18. The apparatus of claim 6, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

19. The apparatus of claim 12, wherein the mounting member is movable relative to the support member under the force of gravity, whereby the force of gravity applies a working force between the stone and the tool, and the spring applies to the mounting member an alterable biassing force to provide a resultant working force of which one component is the force of gravity and the other component is the biassing force.

20. The apparatus of claim 13, wherein the mounting member is rotatable relative to the support member about an axis of rotation and the free movement of the mounting member relative to the support member is parallel to said axis of rotation; whereby the apparatus is usable with a stone holder mounted by the mounting member and the tool in the form of a rotating scaife, for polishing a facet on the stone.

21. Apparatus for working a natural or synthetic stone having a Mohs hardness greater than about 5, using a tool, comprising:

a support member;

a mounting member for mounting a stone holder or a tool holder, the mounting member being movable relative to the support member to provide feed and apply a working force between the stone and the tool;

a rod or leaf spring for applying to the mounting member a biasing force which can, at will, be either in a direction for decreasing said working force or in a direction for increasing said working force, the spring having a first portion acting on the mounting means and a second portion which is movable relative to said first portion and to said support member to alter said biasing force, and an actuating member for altering said biasing force by moving said second portion relative to said support member to bend or unbend said spring about an axis generally at right angles to said relative movement and to said direction, whereby said biasing force can be altered and whereby said biasing force can be directed by said actuating member to be in a direction for decreasing said working force or in a direction for increasing said working force.

* * * * *